US012776674B2

(12) United States Patent
Schuermans et al.

(10) Patent No.: US 12,776,674 B2
(45) Date of Patent: Oct. 27, 2026

(54) ROTOR OF AN ELECTRIC ROTATING MACHINE AND AN ELECTRIC ROTATING MACHINE COMPRISING SUCH A ROTOR

(71) Applicant: TOYOTA JIDOSHA KABUSHIKI KAISHA, Toyota (JP)

(72) Inventors: Raf Schuermans, Brussels (BE); Georgios Mamolis, Brussels (BE); Takahito Endo, Brussels (BE)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 160 days.

(21) Appl. No.: 18/563,162

(22) PCT Filed: May 27, 2022

(86) PCT No.: PCT/IB2022/055022

§ 371 (c)(1),
(2) Date: Nov. 21, 2023

(87) PCT Pub. No.: WO2022/249147

PCT Pub. Date: Dec. 1, 2022

(65) Prior Publication Data

US 2024/0243627 A1 Jul. 18, 2024

(30) Foreign Application Priority Data

May 28, 2021 (EP) .................................... 21176729

(51) Int. Cl.
*H02K 1/27* (2022.01)
*H02K 1/276* (2022.01)

(52) U.S. Cl.
CPC .................................. *H02K 1/2766* (2013.01)

(58) Field of Classification Search
CPC .......................... H02K 1/2766; H02K 2213/03
See application file for complete search history.

(56) References Cited

U.S. PATENT DOCUMENTS 9,793,770 B2 10/2017 Takahashi
2013/0307363 A1* 11/2013 Sano .................... H02K 1/2766 310/156.01
2015/0137650 A1* 5/2015 Takahashi ................ H02K 1/32 310/156.56
2018/0241262 A1* 8/2018 Tang .................... H02K 21/145
(Continued)

FOREIGN PATENT DOCUMENTS

CN 106300734 A 1/2017
CN 106329770 A 1/2017
(Continued)

*Primary Examiner* — Thomas Truong
(74) *Attorney, Agent, or Firm* — Oliff PLC

(57) ABSTRACT

A rotor of an electric motor includes several poles arranged circumferentially relative to the rotor, each pole having a first set proximate a rotor outer edge and a second set farther from the latter. The first and second sets are symmetrical relative to a d-axis. Each symmetrical part in the second set has two opposite ends terminating respectively with an outer flux barrier proximate the outer edge and an opposite inner flux barrier, both inner flux barriers being separated from each other by an arrangement having two radially-extending inner bridges flanking a central radially-extending flux barrier aligned along the d-axis.

18 Claims, 5 Drawing Sheets

(56) References Cited

U.S. PATENT DOCUMENTS

| | | | | |
|---|---|---|---|---|
| 2018/0269735 | A1 | 9/2018 | Kaneshige et al. | |
| 2020/0044501 | A1* | 2/2020 | Matsubara | H02K 29/03 |
| 2020/0259377 | A1* | 8/2020 | Gangi | H02K 1/2766 |
| 2021/0099034 | A1 | 4/2021 | Fatemi et al. | |
| 2021/0152042 | A1 | 5/2021 | Valin et al. | |
| 2021/0242732 | A1* | 8/2021 | Soma | H02K 1/276 |
| 2022/0311292 | A1* | 9/2022 | Liu | H02K 1/276 |

FOREIGN PATENT DOCUMENTS

| | | | |
|---|---|---|---|
| CN | 111555490 | A | 8/2020 |
| CN | 112271838 | A | 1/2021 |
| CN | 112600378 | A | 4/2021 |
| DE | 10 2020 124 089 | A1 | 4/2021 |
| JP | 2018-148597 | A | 9/2018 |
| JP | 2018-157669 | A | 10/2018 |
| JP | 2020-137139 | A | 8/2020 |

* cited by examiner

ROTOR OF AN ELECTRIC ROTATING MACHINE AND AN ELECTRIC ROTATING MACHINE COMPRISING SUCH A ROTOR

FIELD OF THE DISCLOSURE

The present disclosure concerns a rotor of an electric rotating machine and an electric rotating machine comprising such a rotor.

BACKGROUND OF THE DISCLOSURE

The increasing demand for vehicles has led to the rapid development of the automotive industry and the shifting towards vehicle electrification. Hybrid and fully electric vehicles are of increasing interest due to their low or zero emissions nowadays. These types of vehicles can employ different types of electric machines in their drivetrain. Permanent magnet synchronous motor (PMSM) turns out to be the most popular type due to its high power and torque density, high efficiency over a wide speed region, compact design and easy maintenance.

The design of the PMSM is not an easy task and issues that are occurring during the design phase must be addressed and handled carefully. The stator of the PMSM has a three-phase winding of which the coils are excited with a sinusoidally time varying current, thereby producing a rotating magnetic field with constant magnitude. On the other hand, the permanent magnets in the rotor of the PMSM produce a stationary magnetic field, which rotates along with the rotor revolution. The interaction of the two magnetic fields in the air gap between the stator and the rotor results in the production of an electromagnetic torque. Different kinds of PMSM's exist, such as surface PMSM (SPMSM), interior PMSM (IPMSM) and PM assisted synchronous reluctance machine (PMaSynRM).

The IPMSM is a type of motor that has permanent magnets embedded inside the rotor core laminations. A major consideration during the design stage of an IPMSM is the geometry of the pole of the rotor. The arrangement of the magnets in the rotor and the design of their respective pockets including magnetic flux barriers turn out to be crucial if a high torque output with suppressed torque ripple and cogging torque is to be achieved. However, some other aspects need to be taken into account when designing the pole geometry of the rotor.

Another major consideration during the design stage of an IPMSM is the mechanical stability and strength of the rotor. PMSM's have a wide speed range and at high rotational speeds the centrifugal forces become very large and high mechanical stresses arise in the rotor. Therefore, the rotor should have a sufficiently high mechanical strength to be able to withstand the centrifugal forces. This mechanical aspect should therefore be taken into consideration when designing the rotor's pole.

CN 106329770 A discloses an electric motor with a rotor's pole configuration made of one or more magnetic layers radially arranged from the outer edge of the rotor towards the inner of the rotor. Each magnetic layer comprises one or more permanent magnets arranged in slots having different possible configurations and includes a bridge separating the magnets of the magnetic layer (for example L-shape). However, this rotor's pole configuration could be improved in terms of mechanical strength and motor power output.

It would thus be desirable to remedy at least one of the above drawbacks.

DISCLOSURE OF THE INVENTION

According to a purpose of the present disclosure a rotor of an electric rotating machine may be configured to exhibit a strong mechanical performance in order to withstand the centrifugal forces that take place during the rotation of the rotor, in particular, at high rotational speeds.

To meet this purpose, according to the present disclosure a rotor of an electric rotating machine with a novel rotor pole arrangement is proposed. This rotor of an electric rotating machine is configured to rotate about a longitudinal axis and includes a plurality of magnetic poles arranged circumferentially relative to the rotor, each magnetic pole comprising at least a first set and a second set having each a permanent magnet configuration and a flux barrier configuration, the first set being located proximate an outer edge of the rotor and the second set being located radially relative to the longitudinal axis of the rotor farther from the outer edge than the first set,

- wherein each magnetic pole has the following configuration, in a transverse cross section of the rotor relative to its longitudinal axis:
  - each of the first and second sets is symmetrical with respect to a radially-extending symmetry d-axis of the magnetic pole and comprises two symmetrical parts located on either side of the symmetry axis,
  - each symmetrical part in the second set has two opposite ends terminating respectively with an outer flux barrier of the flux barrier configuration that is located proximate the outer edge of the rotor and an inner flux barrier of the flux barrier configuration that is located farther from the outer edge than the outer flux barrier, the inner flux barriers of both symmetrical parts being separated from each other by an arrangement comprising two radially-extending inner bridges flanking a central radially-extending flux barrier that is aligned along the symmetry axis.

The above arrangement with the two radially-extending inner bridges makes it possible for the bridges to receive the centrifugal forces parallel to their direction during the rotation of the rotor. These inner bridges are subjected to tensile stresses only instead of being subjected to a combination of tensile and bending stresses. This inner bridge configuration contributes to improve the mechanical properties of the whole rotor pole arrangement. Further, an inner bridge configuration with two bridges having each a width d instead of a single 2d-width inner bridge configuration results in a locally more uniform stress distribution, in the area of the bridges, which also results in lower stresses in the pole arrangement overall. This may also reduce the flux leakage with respect to the single 2d-width inner bridge configuration, thereby leading to an improved electric rotating machine power output since a greater part of the flux contributes to the power output.

According to further possible aspects:

- each of the two radially-extending inner bridges extends transversely in a direction perpendicular to the radial direction over a dimension that is in a range lying from 0.5 mm to 1.2 mm, depending on the rotor dimensions; the rotor dimensions or size (ex: outer diameter) define the amount of centrifugal force during rotation; thus a higher rotor diameter will require a wider bridge dimension than a smaller rotor diameter; this bridge dimension is minimized according to the mechanical stress limits allowed by the material;

the permanent magnet configuration of the first set S1 is substantially V-shaped or rectilinear and the permanent magnet configuration of the second set S2 is substantially U-shaped or V-shaped;

the permanent magnet configuration in each symmetrical part of the second set includes a first and a second permanent magnets that extend successively and respectively along a first direction that is inclined with respect to the radially-extending symmetry axis and along a second direction that is inclined with respect to the first direction such that the two magnets of both symmetrical parts form conjointly a U shape;

each inner flux barrier in the second set widens in a radial direction as it extends from the adjacent first permanent magnet towards a radially-extending inner bridge along the first direction, each inner flux barrier including in its widened portion a first outward end and a second opposite inward end that are aligned with the radial direction, the first outward end being closer to the outer edge of the rotor than the second inward end;

the central radially-extending flux barrier that is separated from the inner flux barriers of the second set by the two radially-extending inner bridges extends over a radial distance that is substantially the same as the radial distance between the first outward end and the second opposite inward end of each inner flux barrier;

each outer flux barrier in the second set extends from the adjacent second permanent magnet towards the outer edge of the rotor along the second direction and terminates with an end portion that includes a side tip extending along a circumference of the rotor away from the first set;

each symmetrical part in the first set has two opposite ends of which an outer end terminates with an outer flux barrier of the flux barrier configuration that is located proximate the outer edge of the rotor;

each outer flux barrier in the first set extends in a circumferential direction in a nose-type shape having a first side or nose bridge that extends parallel to the outer edge of the rotor from a first outward end or top of the nose to a second opposite outward end or tip of the nose and a second side or nose base that extends from the second end away from the outer edge and towards a third inward end, the second outward end being located farther from the permanent magnet configuration than the first outward end; this configuration may also apply when the first set is substantially rectilinear and not V-shaped;

the permanent magnet configuration in each symmetrical part of the first set includes a permanent magnet that extends along a direction that is inclined with respect to the radially-extending symmetry axis such that the permanent magnets of both symmetrical parts form conjointly a V shape;

each outer flux barrier in the first set extends from the adjacent permanent magnet towards the outer edge of the rotor along a direction that is inclined with respect to the direction of extension of the adjacent permanent magnet;

each symmetrical part in the first set has an inner end opposite the outer end and both inner ends are separated from each other by a radially-extending bridge that is aligned along the symmetry axis;

each outer flux barrier of each of the first and second sets is not separated from the permanent magnet configuration of the concerned set;

an outer bridge is located between the outer edge of the rotor and each outer flux barrier of each of the first and second sets, each outer bridge of the second set extending over a radial distance between the outer edge of the rotor and each outer flux barrier that is greater than that of each outer bridge of the first set.

A second purpose of the present disclosure is to propose an electric rotating machine comprising a rotor as briefly defined above.

The features and advantages mentioned above in relation with the rotor also apply here to the electric rotating machine and will not be repeated.

A third purpose of the present disclosure is to propose a vehicle comprising an electric rotating machine as briefly defined above.

BRIEF DESCRIPTION OF THE DRAWINGS

The present invention may be better understood and its numerous other objects and advantages will become apparent to those skilled in the art by reference to the accompanying drawings wherein like reference numerals refer to like elements in the several figures and in which.

DESCRIPTION OF PREFERRED EMBODIMENTS

Figure 1:
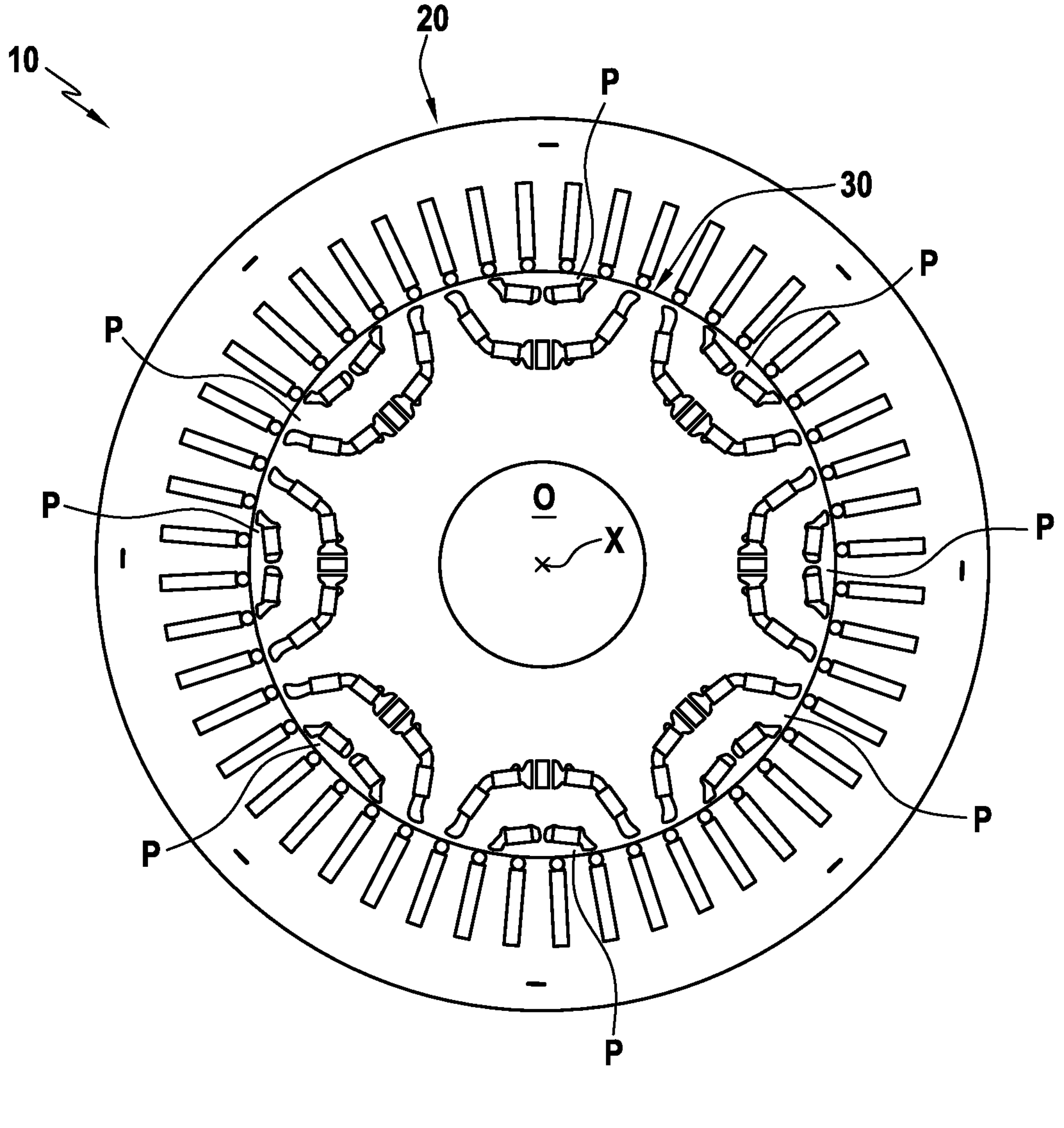
FIG. 1 is a schematic representation in a transverse cross section of an electric rotating machine according to an embodiment of the present disclosure.

An electric rotating machine 10 (ex: a motor), e.g. of a vehicle, in accordance with an embodiment of the present disclosure comprises a stator 20 of a conventional type and a rotor 30 as schematically illustrated in FIG. 1. Such an electric motor may be embodied in a hybrid car or a BEV.

The electric rotating machine may be a permanent magnet synchronous motor or PMSM and, for instance, of any of the following types: interior PMSM (IPMSM) and PM assisted synchronous reluctance machine (PMaSynRM).

The stator 20 and the rotor 30 functionally cooperate together in a conventional manner. The stator 20 is provided with a three-phase winding wound onto the latter. The coils of the three-phase winding are supplied, and therefore excited, with sinusoidal currents varying in time and having each a phase displacement in time. This arrangement generates a rotating magnetic field with constant magnitude. The rotor 30 includes permanent magnets generating a stationary magnetic field that rotates along with the movement of revolution of the rotor about its axis. The two magnetic fields thus generated interact with each other in the air gap between the stator and the rotor, which produces an electromagnetic torque.

More particularly, the rotor 30 comprises a plurality of magnetic poles and, as illustrated in the exemplary embodiment of FIG. 1, comprises 8 poles P that are identical to each other and exhibit each here a possible configuration or geometry. However, a rotor pole arrangement with a different number of poles (e.g. 2, 4, 6 etc.) may alternatively be envisaged. In the transverse cross section of FIG. 1, the poles P or rotor pole regions or areas are angularly spaced about the longitudinal axis X of the rotor (the rotor is configured to rotate about this axis), each pole being flanked by two other adjacent poles angularly spaced about axis X. As represented in FIG. 1, a central opening O may be provided in the rotor to accommodate a rotor shaft (not represented) of axis X on which the rotor may be rotatably mounted.

In the present embodiment the rotor 30 may be formed by a stack of rotor plates or laminations which may be uniform or not and fixed together in a conventional manner, e.g. by gluing, welding, etc. The rotor laminations may be made of magnetizable material such as an e-steel. The rotor plates exhibit each a specific configuration or geometry that defines the pole geometry of the rotor as will be described below.

Figure 2:
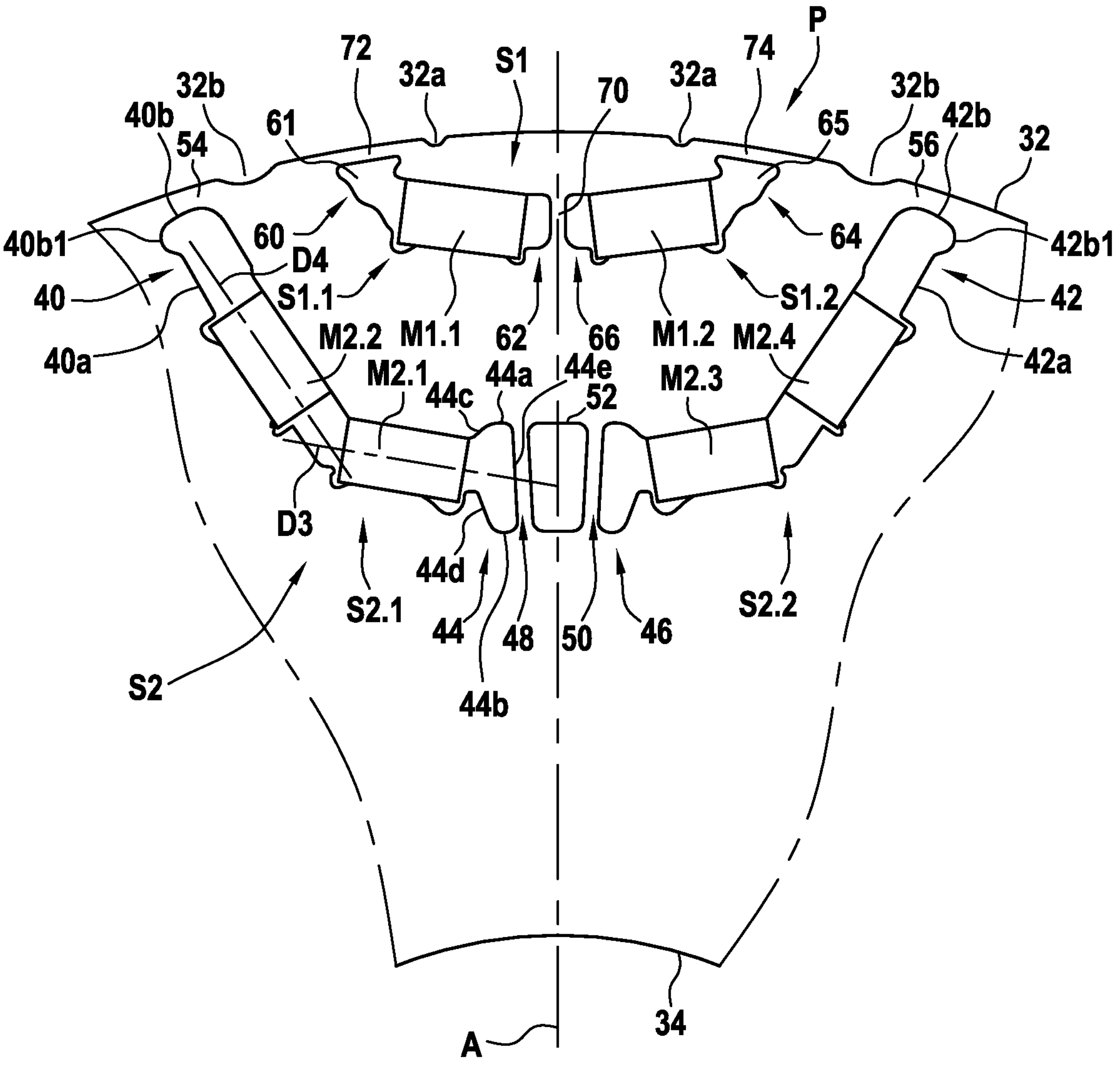
FIG. 2 is a partial and enlarged view of a rotor pole arrangement of the rotor of FIG. 1.

The transverse cross section of FIG. 2 illustrates an enlarged view of the possible configuration or geometry of one pole P of the FIG. 1 rotor 30. The other poles that are arranged circumferentially relative to the rotor have the same configuration or geometry.

As represented in FIG. 2, the pole P represents an angular segment of the FIG. 1 rotor which is bounded by an outer edge 32 defining the external outline of the rotor (outer circle or diameter) and an opposite inner edge 34 (inner circle or diameter) delimitating the above-mentioned rotor central opening. The outer edge 32 may have recesses or indents 32*a*, 32*b* that locally modify its profile so as to distribute the magnetic flux in the air gap between the rotor and the stator, which makes smoother the torque of the rotating machine (motor). The boundaries of the angular segment may alternatively be configured differently, e.g. with more or less recesses or indents, whatever their form.

The pole P may be internally configured so as to comprise a first set S1 and a second set S2 having each a permanent magnet configuration and a flux barrier configuration, which means that each set is configured with one or more receiving pockets for receiving permanent magnets and one or more flux barriers. In another embodiment the pole may comprise more than two sets of the above type.

As more particularly represented in FIG. 2, the first set S1 is located proximate the outer edge 32 of the rotor and the second set S2 is located radially relative to the longitudinal axis X farther from the outer edge than the first set. In other words, the second set S2 is located closer to the inner edge 34 than the first set.

The pole P exhibits a symmetrical configuration with respect to a radially-extending symmetry axis A which corresponds to the d-axis or pole axis of the magnetic pole.

Each set S1 and S2 is symmetrical with respect to d-axis A and comprises two symmetrical parts or sections S1.1, S1.2 and S2.1, S2.2 respectively that are located on either side of the symmetry axis and mirrored to each other.

As more particularly represented in the possible pole configuration of FIG. 2, the first set S1 may substantially be V-shaped and the second set S2 may substantially be U-shaped. More particularly, the shapes of the first and second sets S1, S2 are conferred by the shapes of their permanent magnet configurations. Both V shape and U shape are open on one side that is oriented towards the outer edge 32 of the rotor while the other opposite side is oriented towards the central part of the rotor and the longitudinal axis. As apparent in the drawing, the U shape is open towards the V shape and is therefore integrated more inwardly inside the angular segment of FIG. 2 than the V shape that is located closer to the outer part of the angular segment.

Other shapes may be envisaged for these sets as will be described subsequently with reference to FIGS. 4 to 6.

The permanent magnet configuration of the first set S1 may comprise two permanent magnets M1 and M2 in total with one permanent magnet in each symmetrical part of the set.

Figure 3:
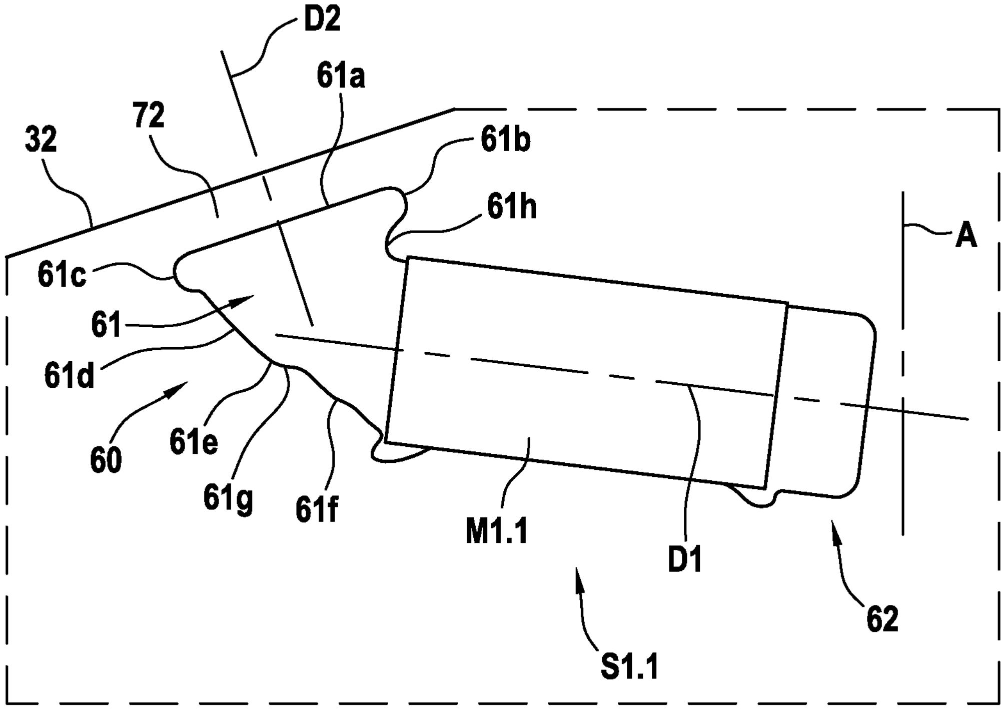
FIG. 3 is an enlarged and partial schematic representation of one of the two symmetrical parts in the first set S1 of FIG. 2.

FIG. 3 is an enlarged and partial view of FIG. 2 representing the symmetrical part S1.1 of the first set S1 which includes magnet M1.1. The following description equally applies to the other symmetrical part S1.2 including magnet M1.2.

The permanent magnet M1.1 may extend along a direction D1 that is inclined with respect to the radially-extending symmetry axis A such that the magnets M1.1 and M1.2 of both symmetrical parts S1.1 and S1.2 may form conjointly a V shape.

It is to be noted that the magnets M1.1 and M1.2 could alternatively be segmented along a direction that is parallel to the main rotor axis.

The permanent magnet configuration of the second set S2 (FIG. 2) may comprise four permanent magnets in total with two permanent magnets in each symmetrical part of the set: each symmetrical part S2.1, S2.2 may include a first permanent magnet M2.1, M2.2 and a second permanent magnet M2.3, M2.4 respectively.

Overall, the magnets in each set have to be as close as possible to the outer diameter 32 (i.e. as close as possible to the air gap with the stator) in order to maximize the electromagnetic interaction while, at the same time, having sufficient material between the outer diameter 32 and the magnets is necessary in order to provide sufficient mechanical strength for withstanding the great centrifugal forces that take place at high rotation speed of the rotor.

The first permanent magnet M2.1 (resp. M2.3) may extend along a first direction D3 that is inclined with respect to the radially-extending symmetry axis A. The second permanent magnet M2.2 (resp. M2.4) may extend along a second direction D4 that is inclined with respect to the first direction D3 such that the two magnets of both symmetrical parts S2.1, S2.2 (i.e. the four magnets in total) form conjointly a U shape. The reason for inclination between D3 and D4 is based on electromagnetic flux reasons: the magnetic flux has to be guided to the air gap (towards outer edge 32), while the magnet position has to be kept as close as possible to edge 32 for efficient interaction with the air gap. The magnets M2.1 and M2.2 can be replaced by a greater number of magnets, e.g. 4 in total, with reduced dimensions (same for magnets M2.3, M2.4) that are arranged along the two respective directions D3 and D4, or alternatively along an arch shape that is approximately defined by these two directions. Alternatively, curved magnets can be used. For example, the second direction D4 may lie in a range from 5 to 20° with respect to D3. To be noted that both extension directions D1 and D3 of the respective two sets S1 and S2 may be parallel to each other or not.

Each symmetrical part S2.1, S2.2 in the second set S2 has two opposite ends which may terminate respectively with an outer flux barrier 40, 42 that is located proximate the outer edge 32 of the rotor and an inner flux barrier 44, 46 that is located farther from the outer edge 32 than the corresponding outer flux barrier 40, 42 and, more particularly, proximate the d-axis A.

The inner flux barriers 44, 46 that are located on either side of the d-axis A are separated from each other, in a transverse direction that follows an inner circumference of the rotor, by an arrangement comprising two radially-extending inner bridges 48, 50 that flank a central radially-extending flux barrier 52 aligned along the d-axis A. Central flux barrier 52 may be straddling the d-axis A as illustrated in FIG. 2.

Each of the two radially-extending inner bridges 48, 50 has its origin at the centre of the rotor and may extend transversely in a direction perpendicular to the radial direction of extension of the bridge over a dimension, called width, that is in a range lying from 0.5 mm to 1.2 mm, depending on the dimensions of the rotor, in particular its outer diameter, so as to render the thin bridges capable of withstanding the stresses originating from the centrifugal forces during rotation of the rotor, in particular at high rotational speeds. If the dimension is less than 0.5 mm, then the mechanical strength is not sufficient to withstand the forces resulting from the rotor rotation. If the dimension is greater than 1.2 mm, this will cause a leakage path for the flux.

In a given embodiment, the rotor has an outer dimension that is approximately 140 mm and each inner bridge 48, 50 may have a width of 0.8 mm.

To be noted that the width of each of inner bridges 48, 50 may not be necessarily constant all along its length (radial direction).

In a general manner, a central configuration with two bridges separating two inner flux barriers 44, 46 from each other (even with another configuration for the inner flux barriers) makes it possible to share the centrifugal load arising during rotation of the rotor between the two bridges, thereby resulting in a lower stress distribution in the rotor pole arrangement, in particular in areas such as the outer bridges 54, 56 of the second set S2 (to be described subsequently) where high stresses may occur (outer bridges 72 and 74 to be described later are also subjected to such centrifugal forces). Since lower stress is to occur in the rotor, in particular in the areas of the outer bridges 54, 56 (as well as in the areas of the outer bridges 72 and 74 to be described later), the latter can be made thinner, which leads to increased electromagnetic performance for the rotor. The central configuration with two bridges separating two inner flux barriers confers an increased mechanical strength to the rotor pole arrangement and, therefore, to the rotor.

Further, the proposed configuration with two bridges separating two inner flux barriers in order to connect as much as possible the central or bottom part of the U shape (in the area between magnets M2.1 and M2.3) enables reduction in the leakage flux from the adjacent permanent magnets M2.1 and M2.3 with a view to increasing the average torque output from the permanent magnets. In this respect, the inner bridges 48, 50 are designed as thin as possible to reduce the leakage magnetic flux (the wider the bridges, the greater leakage flux from the magnets), while keeping them sufficiently strong (and therefore not too thin) in order to withstand the centrifugal forces arising at high rotational speeds of the rotor.

As illustrated in FIG. 2, the inner flux barrier 44 (resp. 46) in the second set S2 may widen in a radial direction as it extends from the adjacent first permanent magnet M2.1 (resp. M2.3) towards the corresponding radially-extending inner bridge 48 (resp. 50) along the first direction D3 (resp. the symmetrical direction with respect to d-axis A for magnet M2.3).

The following description concerns the inner flux barrier 44 but equally applies to the symmetrical inner flux barrier 46.

More particularly, each inner flux barrier, as inner flux barrier 44, may include in its widened portion a first outward end 44*a* and a second opposite inward end 44*b* that are both aligned with the radial direction along which this flux barrier extends. As illustrated, the first outward end 44*a* is closer to the outer edge 32 of the rotor than the second inward end 44*b* and the inner flux barrier terminates with a substantially rectilinear wall 44*e* that connects the two opposed ends 44*a*, 44*b* and is aligned with radial extension direction of the inner flux barrier (the substantially rectilinear wall 44*e* forms a lateral side of the bridge 48, the other lateral side thereof being formed by one external wall of the adjacent flux barrier 52). Put it another way, the inner flux barrier 44 includes two side walls 44*c*, 44*d* that flare out from magnet M2.1 and extend to the first outward end 44*a* and the second inward end 44*b* respectively. As more particularly represented in FIG. 2, the side wall 44*d* forms a curved shape starting from the area where the pocket is configured to maintain the magnet M2.1 and which makes substantially a 180° turn before extending radially towards the centre of the rotor as far as the second inward end 44*b*. This curved and radially-extending portion serves to guide the flux from magnet M2.1 around the inner flux barrier 44 and inside the bridge 48. The resulting inner flux barrier 44 has an overall shape of a shoe where the side wall 44*c* is the heel of the shoe and the side wall 44*d* is the front of the shoe.

The central radially-extending flux barrier 52 that is separated from the inner flux barriers 44, 46 by the two radially-extending inner bridges 48, 50 may extend over a radial distance that is substantially the same as the radial distance between the first outward end, 44*a* for inner flux barrier 44, and the second opposite inward end, 44*b* for inner flux barrier 44, of each inner flux barrier 44, 46. It is preferred in this embodiment that the central flux barrier 52 does not extend radially inwardly and/or outwardly with respect to inner flux barriers 44, 46 to avoid a negative impact on the mechanical and/or electromechanical performance of the rotor's pole.

Also, as represented in FIG. 2, the central radially-extending flux barrier 52 may extend over a dimension or width that is approximately comprised between 2.5 and 3.5 mm in its median portion, depending on the rotor dimensions.

To be noted that the flux barrier 52 has a substantially divergent shape from its innermost located end (proximate inner edge 34 of the rotor) toward its outermost located end (away from inner edge 34 of the rotor) so as to follow the shape of the inner flux barriers 44, 46 in order to maintain a constant width for the two radially-extending inner bridges 48, 50.

Each outer flux barrier 40, 42 in each symmetrical part S2.1, S2.2 of the second set S2 may extend from the adjacent second permanent magnet M2.2, M2.4 towards the outer edge 32 of the rotor along the second extension direction D4 for magnet M2.2 and along the symmetrical direction with respect to d-axis A for magnet M2.4 through a rectilinear portion 40*a*, 42*a*. The extension portion or pocket 40*a*, 42*a* may extend towards outer edge 32 over a dimension that is as great as possible, while keeping sufficient material thickness between the end of the outer flux barrier 40, 42 and the outer edge 32 so as to ensure sufficient (minimal) centrifugal mechanical performance in the course of rotation of the rotor.

As illustrated in FIG. 2, each outer flux barrier 40, 42 terminates with an end portion 40*b*, 42*b* that may include a side tip 40*b*1, 42*b*1 (e.g. rounded edge) extending along a circumference of the rotor (or in a tangent direction) in a direction away from the first set S1. Such a tip shape helps guide the flux, thereby improving and optimizing the electromagnetic performance.

Further, an outer bridge 54, 56 is located between the outer edge 32 of the rotor and the end portion 40*b*, 42*b* of each outer flux barrier 40, 42. As it is apparent, each outer bridge 54, 56 extends along the rotor outer edge 32 with a slightly increasing distance or thickness between the latter and the corresponding end portion 40*b*, 42*b* away from the first set S1, so as to have more material in this area for mechanical strength.

As represented in FIGS. 2 and 3, each symmetrical part S1.1 and S1.2 of the first set S1 has two opposite ends 60, 62 and 64, 66 respectively: an outer end 60 for S1.1 (resp. 64 for S1.2) that is located proximate the outer edge 32 of the rotor and an opposite inner end 62 for S1.1 (resp. 66 for S1.2) that is located farther from the outer edge 32.

Each outer end 60, 64 may terminate with an outer flux barrier 61, 65 of the first set flux barrier configuration that is located proximate the outer edge 32 of the rotor. The following description of the outer flux barrier 61 of part S1.1 likewise applies to the symmetrical outer flux barrier 65 of part S1.2.

As more particularly illustrated in the enlarged view of FIG. 3, the outer flux barrier 61 may extend in a circumferential direction, i.e. substantially along the rotor edge 32, in a nose-type shape. This nose-shaped outer flux barrier 61 may comprise a first side 61*a* or nose bridge that extends parallel to the outer edge 32 from a first outward end 61*b* or top of the nose to a second opposite outward end 61*c* or tip of the nose. In the present configuration of FIGS. 2 and 3, the second opposite outward end 61*c* is oriented toward the second set S2 and is located farther from the permanent magnet configuration, i.e. permanent magnet M1.1, than the first outward end 61*b*.

The nose-shaped outer flux barrier 61 may also comprise a second side 61*d* or nose base that extends from the second end 61*c* away from the rotor outer edge 32 and towards a third inward end 61*e* that is located inwardly relative to the first and second outward ends 61*b* and 61*c*.

As represented in the present configuration, the nose-shaped outer flux barrier 61 may further extend from the third inward end 61*e* towards the permanent magnet M1.1 through a third substantially rectilinear side 61*f*. Side 61*f* may be slightly inwardly offset relative to the second side 61*d* and may extend substantially parallel to the latter in the present configuration. Side 61*f* may be connected to the end 61*e* through a slight slope 61*g*, thereby enabling to connect end 61*e* to the pocket of permanent magnet M1.1 without any acute angle.

As represented in the present configuration, the first outward end 61*b* may be connected to the pocket of permanent magnet M1.1 through a curved side or portion 61*h*.

It is to be noted that the overall shape of the outer flux barrier 61 may differ from the above described nose-type shape. In particular, sides 61*d* and 61*f* need not necessarily be parallel to each other. In a variant embodiment (not represented) side 61*d*, end 61*e*, slight slope 61*g* and side 61*f* may be replaced by a single side connecting second end 61*c* to the pocket of permanent magnet M1.1 without any acute angle.

In a general manner, for mechanical stress reasons smooth and rounded transitions in the flux barrier configurations of each of the sets S1 and S2 are preferred to edged transitions that would cause stress peaks.

Overall, the outer flux barrier 61 may extend from the adjacent permanent magnet pocket (which houses magnet M1.1) towards the outer edge 32 of the rotor along a direction D2 that is inclined with respect to the direction D1 of extension of the adjacent permanent magnet M1.1 for electromagnetic flux reasons: the magnetic flux has to be guided to the air gap (between the rotor and the stator), i.e. towards outer edge 32, while the magnet position has to be as close as possible to this edge for efficient interaction with the air gap. It is to be noted that the magnet M1.1 could be replaced by two or more magnets arranged along an arch shape, depending on the available space in the area of the set S1 relative to outer edge 32.

The direction of extension D4 may be parallel to D2 or not (see FIG. 3).

The role of outer flux barriers is to guide the flux lines from the magnets around them, which results in a more uniform air gap flux density distribution. The design of outer flux barriers 61 and 65 with a substantially nose-shaped type extending circumferentially along the rotor outer edge 32 (even though they are slightly modified in shape and/or orientation) makes it possible to produce a more uniform distribution of the radial component of the air gap flux density, thereby leading to a lower air gap reluctance, reduced torque ripple and cogged torque and higher torque output. The reluctance torque that is generated by the pole configuration (difference in inductance between the d-axis and the q-axis) of the motor is thus increased. The configuration of the outer flux barriers as flux barrier 61 with the circumferentially oriented thin tips or ends 61*b*, 61*c* (same holds true for outer flux barrier 65) results in a decrease of the pole axis (or d-axis) inductance of the rotor, which leads to a reluctance torque boost.

As mentioned above, the two inner ends 62 and 66 of parts S1.1 and S1.2 respectively are separated from each other by a radially-extending bridge 70 (FIG. 2) that is aligned along the symmetry axis A. Bridge 70 may have a width lying between 0.5 and 1.5 mm, depending on the rotor dimensions.

Each inner end 62, 66 may play the role of an inner flux barrier.

Further, an outer bridge 72, 74 is located between the outer edge 32 of the rotor and the first side of each outer flux barrier 61, 65, for example first side 61*a* of outer flux barrier 61. As it is apparent, each outer bridge 72, 74 extends along the rotor outer edge 32 with a substantially constant radial distance or thickness between the latter and the corresponding first side of each outer flux barrier 61, 65.

It is to be noticed that each outer bridge 72, 74 has to be as thin as possible (for magnetic performance reasons) but thick enough to withstand the bending forces that occur due to high rotational speeds of the rotor. A minimum thickness of 0.9 mm may be envisaged. Given the relatively small thickness of the bridge, a parallel configuration between edge 32 and the corresponding first side of each outer flux barrier 61, 65 is more appropriate. To be noted that if no bridge 70 were present in the configuration, then outer bridges 72, 74 would be submitted to a huge bending force during operation (rotation) of the rotor.

Regarding the second set S2, each outer bridge 54, 56 of may extend over a radial distance between the outer edge 32 of the rotor and the end portion 40*b*, 42*b* of each outer flux barrier 40, 42 that is greater than that of each outer bridge 72, 74 of the first set S1. This can be explained by the fact that the mechanical load exerted on bridges 54 and 56 is higher than that exerted on bridges 72 and 74 of the first set because there is less mechanical connection of the magnet pockets of the second set towards the centre of the rotor (the magnet pockets are much longer because they hold two magnets M2.1 and M2.2 in series with no metal in between them for part S2.1 (same explanation applies to part S2.2 with magnets M2.3 and M2.4)

In both sets S1 and S2 each outer flux barrier of each set may not be separated from the adjacent permanent magnet configuration (i.e. the magnet receiving pockets) of the concerned set. Thus, the leakage flux from the permanent magnets that are positioned in the adjacent receiving pockets is reduced, which contributes to increasing the magnitude of the magnetic flux density in the air gap between the rotor and the stator, thereby leading to a higher torque output. In other words, the outer flux barriers 40 and 42 for S1 (resp. 61 and 65 for S2) extend directly from the adjacent permanent magnets M1.1 and M1.2 (M2.2 and M2.4 for S2) or their receiving pockets, thereby meaning that there is no intermediate or additional element or structure in-between such as a bridge.

It has to be noted that the flux barriers of the different sets can be air pockets or filled in with resin.

Numerical simulations have been performed to illustrate the advantages provided by a rotor having the rotor pole configuration of FIGS. 1 and 2 compared with a rotor pole configuration that differs therefrom only by the presence of a single wider bridge between two spaced apart wider inner flux barriers in the U-shaped set.

In a specific numerical example based on the configuration of FIGS. 1 and 2, the width of each inner bridge 48, 50 is selected to be 0.9 mm and the width of the single wider bridge of the comparison configuration is 1.8 mm, i.e. overall twice the width of each inner bridge 48, 50, for a rotor diameter of 140 mm.

The numerical simulations have been carried out through rotating both motors equipped each with one of the above-described rotor pole configurations at a rotational speed of for example 17,000 rpm and determining in a conventional manner the well-known Von Mises stress distribution in the rotor pole configuration.

It has thus been observed that in the rotor pole configuration of FIGS. 1 and 2 the highest stresses are located in the center or bottom of the U-shaped configuration, more particularly along the two bridges 48, 50, as well as in the outer bridges 54, 56 of the U-shaped configuration. The maximum Von Mises stress can be more particularly observed in the area of the two bridges 48, 50 where it can reach a value of 385 MPa in this example. The specific geometry of this configuration with the two bridges makes it possible to relieve or relax the overall mechanical stress levels in the entire pole configuration, and more particularly in all the outer bridges 72 and 74 (for the first set) and 54 and 56 (for the second set) of the rotor pole. By reducing the stresses in the outer bridges, the latter have been made thinner, and the permanent magnets have been made closer to the air gap, thereby leading to better magnetic performance. The two inner bridges 48, 50 are positioned in such a way that they are subjected to tensile forces only, that is, more particularly, both their central axis are inclined relative to each other and are meeting at the center point of the rotor (pole) where rotor axis X is represented in FIG. 1.

In the rotor pole configuration with a single wider bridge between two spaced apart wider inner flux barriers in the U-shaped configuration the highest stresses are located in the center or bottom of the U-shaped configuration, more particularly in the area of the single central bridge, as well as in the outer bridges of the U-shaped configuration as well as in those of the V-shaped configuration. However, in this configuration the maximum Von Mises stress can reach a value of 460 MPa in this example, which is much higher (approximately 20% higher) than the above value for the configuration of FIGS. 1 and 2. In the area of the center or bottom of the U-shaped configuration, the single wider bridge is subjected to both tensile and bending forces instead of only tensile forces in each of the two inner bridges of the FIGS. 1 and 2 configuration. Also, in such a case, the outer bridges of the U-shaped configuration are subjected to higher bending force and therefore higher generated stresses that in the FIGS. 1 and 2 configuration.

Figure 4:
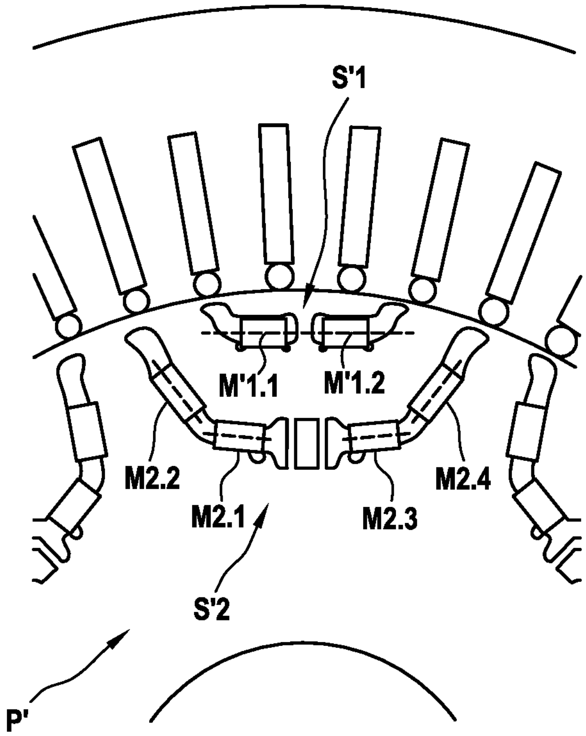
FIG. 4 is a partial and enlarged view of a rotor pole arrangement according to another embodiment of the present disclosure.
Figure 5:
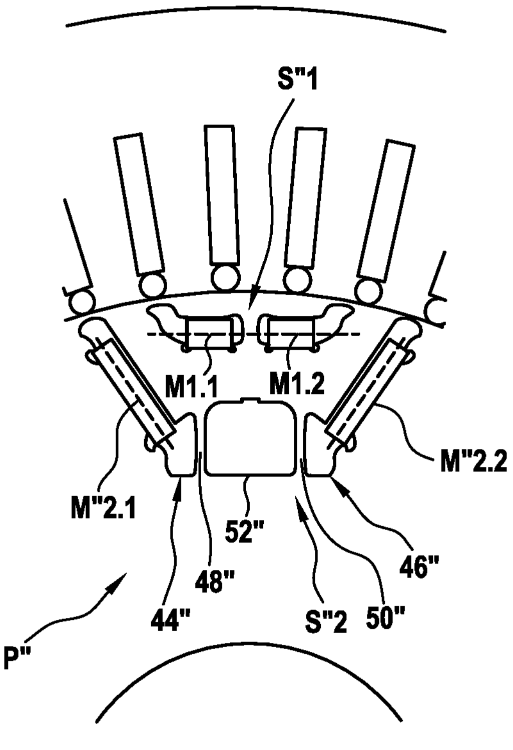
FIG. 5 is a partial and enlarged view of a rotor pole arrangement according to a further embodiment of the present disclosure.
Figure 6:
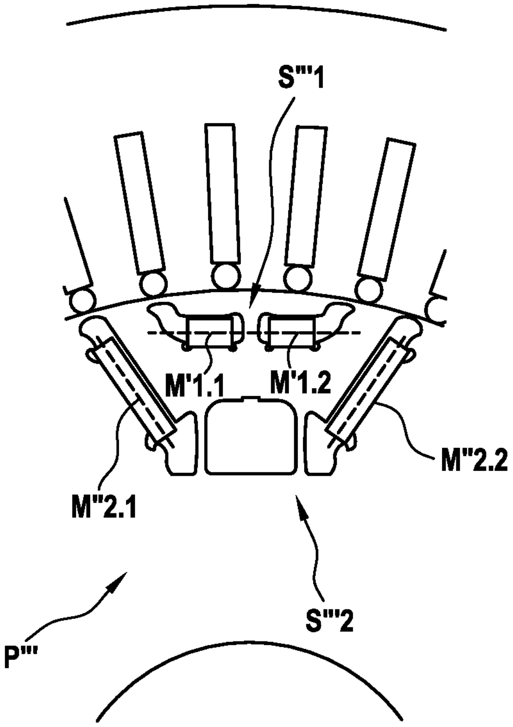
FIG. 6 is a partial and enlarged view of a rotor pole arrangement according to still a further embodiment of the present disclosure.

Other rotor pole configurations may be envisaged within the frame of the present disclosure such as those illustrated in FIGS. 4 to 6. Only the differences with respect to the above embodiments will be detailed hereafter. All the aspects (features, functions, advantages, variants etc.) that are not described below are taken over from the above description except where the aspects are mutually exclusive from each other or inconsistent with each other (ex: all that has been described above concerning the inclination of the magnets M1.1 and M1.2 cannot apply to the non-inclined magnets M'1.1 and M'1.2).

The rotor pole configuration P' of FIG. 4 comprises two sets S'1 and S'2 having each a permanent magnet configuration and a flux barrier configuration, wherein:

the permanent magnet configuration of the first set S'1 is substantially rectilinear, here horizontal for the pole represented, but in general, the rectilinear axis along which the magnets M'1.1 and M'1.2 of the first set are lying is substantially perpendicular to the d-axis; —the permanent magnet configuration of the second set S'2 is substantially U-shaped and may have the same features as those described above and, in particular, includes the four magnets M2.1, M2.2, M2.3 and M2.4.

The rotor pole configuration P" of FIG. 5 comprises two sets S"1 and S"2 having each a permanent magnet configuration and a flux barrier configuration, wherein:

the permanent magnet configuration of the first set S"1 is substantially V-shaped and may have the same features as those described above and, in particular, includes the two magnets M1.1 and M1.2;

the permanent magnet configuration of the second set S"2 is substantially V-shaped.

The V-shaped configuration of second set S"2 includes two magnets M"2.1 and M"2.2 that are spaced apart from each other and inclined with respect to the d-axis on either part thereof. As for the permanent magnet configuration of second set S"2, the two symmetrical parts of the set terminate each with an inner flux barrier 44" and 46" that may slightly differ in shape and dimensions from the corresponding elements 44 and 46 of FIG. 2 in order to provide the best flux guidance through optimized shape and dimensions.

The second set S"2 includes an arrangement comprising two radially-extending inner bridges 48" and 50" flanking a central radially-extending flux barrier 52" that is aligned along the symmetry d-axis of the pole.

This arrangement separates the two inner flux barriers 44" and 46" from each other and in the described configuration the central flux barrier 52" is wider than central flux barrier 52 of FIG. 2 for optimization purpose (optimized shapes and dimensions depend on the location in the rotor layout).

The role of the two radially-extending inner bridges 48" and 50" is the same as explained above.

The rotor pole configuration P''' of FIG. 6 comprises two sets S'''1 and S'''2 having each a permanent magnet configuration and a flux barrier configuration, wherein:

the permanent magnet configuration of the first set S'''1 is substantially rectilinear and may be identical to first set S'1 of FIG. 4;

the permanent magnet configuration of the second set S"2 is substantially V-shaped and may be identical to second set S"2 of FIG. 5.

As for the embodiments and variants described above with reference to FIGS. 1 to 3, the permanent magnets of the permanent magnet configuration of each set in FIGS. 4 to 6 may be rectangular such as an ingot or curved when viewed in a cross-section transversally relative to the longitudinal axis of the rotor.

What is claimed is:

1. A rotor of an electric rotating machine that is configured to rotate about a longitudinal axis, the rotor comprising:

a plurality of magnetic poles arranged circumferentially relative to the rotor, each of the magnetic poles comprising at least a first set and a second set each having a permanent magnet configuration including a permanent magnet and a flux barrier configuration, the first set being located proximate an outer edge of the rotor and the second set being located relative to the longitudinal axis of the rotor radially farther from the outer edge than the first set, wherein each magnetic pole has the following configuration, in a transverse cross section of the rotor relative to the longitudinal axis:

each of the first set and the second set is symmetrical with respect to a radially-extending symmetry d-axis of the magnetic pole and comprises two symmetrical parts located on either side of the symmetry d-axis, and each of the symmetrical parts in the second set has two opposite ends terminating respectively with an outer flux barrier of the flux barrier configuration that is located proximate the outer edge of the rotor and an inner flux barrier of the flux barrier configuration that is located farther from the outer edge than the outer flux barrier, the inner flux barriers of both symmetrical parts being separated from each other by an arrangement comprising two radially-extending inner bridges flanking a central radially-extending flux barrier that is aligned along the symmetry d-axis, and the symmetrical parts in the first set has a first symmetrical part and a second symmetrical part, the first symmetrical part has a first outer flux barrier of the flux barrier configuration that is located proximate the outer edge of the rotor, the second symmetrical part has a second outer flux barrier of the flux barrier configuration that is located proximate the outer edge of the rotor, the outer edge has a first recess or indent, a second recess or indent, a third recess or indent and a fourth recess or indent, the first outer flux barrier of the first set is between the first recess or indent and the second recess or indent, and the second outer flux barrier of the first set is between the third recess or indent and the fourth recess or indent.

2. The rotor according to claim 1, wherein each of the inner flux barriers includes a widened portion with a first outward end and a second opposite inward end that are aligned with the radial direction, and the first outward end and the second opposite inward end protrude beyond a width of the permanent magnet of the second set.

3. The rotor according to claim 2, wherein each of the two radially-extending inner bridges extends transversely in a direction perpendicular to the radial direction over a dimension from 0.5 mm to 1.2 mm.

4. The rotor according to claim 2, wherein the permanent magnet configuration of the first set is substantially V-shaped or rectilinear and the permanent magnet configuration of the second set is substantially U-shaped or V-shaped.

5. The rotor according to claim 2, wherein the permanent magnet in each of the symmetrical parts of the second set includes a first permanent magnet and a second permanent magnet that extend successively and respectively along a first direction that is inclined with respect to the radially-extending symmetry d-axis and along a second direction that is inclined with respect to the first direction such that the first permanent magnet and the second permanent magnet of both symmetrical parts conjointly form a U shape.

6. The rotor according to claim 5, wherein each of the outer flux barriers in the second set extends from the second permanent magnet that is adjacent towards the outer edge of the rotor along the second direction and terminates with an end portion that includes a side tip extending along a circumference of the rotor away from the first set.

7. The rotor according to claim 2, wherein the central radially-extending flux barrier that is separated from the inner flux barriers of the second set by the two radially-extending inner bridges extends over a radial distance that is substantially the same as the radial distance between the first outward end and the second inward end of each of the inner flux barriers.

8. The rotor according to claim 2, wherein each of the symmetrical parts in the first set has two opposite ends of which an outer end terminates with an outer flux barrier of the flux barrier configuration that is located proximate the outer edge of the rotor.

9. The rotor according to claim 8, wherein each of the outer flux barriers in the first set extends in a circumferential direction in a nose-type shape having a first side or nose bridge that extends parallel to the outer edge of the rotor from a first outward end or top of the nose to a second opposite outward end or tip of the nose and a second side or nose base that extends from the second end away from the outer edge and towards a third inward end, the second outward end being located farther from the permanent magnet configuration than the first outward end.

10. The rotor according to claim 8, wherein the permanent magnet extends along a direction that is inclined with respect to the radially-extending symmetry d-axis such that the permanent magnets of both symmetrical parts conjointly form a V shape.

11. The rotor according to claim 8, wherein each of the outer flux barriers in the first set extends from the permanent magnet that is adjacent towards the outer edge of the rotor along a direction that is inclined with respect to the direction of extension of the permanent magnet that is adjacent.

12. The rotor according to claim 8, wherein each of the symmetrical parts in the first set has an inner end opposite the outer end and both inner ends are separated from each other by a radially-extending bridge that is aligned along the radially-extending symmetry d-axis.

13. The rotor according to claim 8, wherein each of the outer flux barriers of each of the first set and the second set is not separated from the permanent magnet configuration of a respective one of the first set and the second set.

14. The rotor according to claim 8, wherein an outer bridge is located between the outer edge of the rotor and each of the outer flux barriers of each of the first set and the second set, the outer bridge of the second set extending over a radial distance between the outer edge of the rotor and each of the outer flux barriers that is greater than that of the outer bridge of the first set.

15. An electric rotating machine comprising a rotor according to claim 2.

16. A vehicle comprising an electric rotating machine according to claim 15.

17. The rotor according to claim 2, wherein the central radially-extending flux barrier is filled with a resin.

18. The rotor according to claim 1, wherein the central radially-extending flux barrier is filled with a resin.

* * * * *